July 13, 1926. 1,592,691
F. ENGEL
MECHANISM AND METHOD FOR PASTING BATTERY PLATES
Original Filed Sept. 24, 1917    5 Sheets-Sheet 1
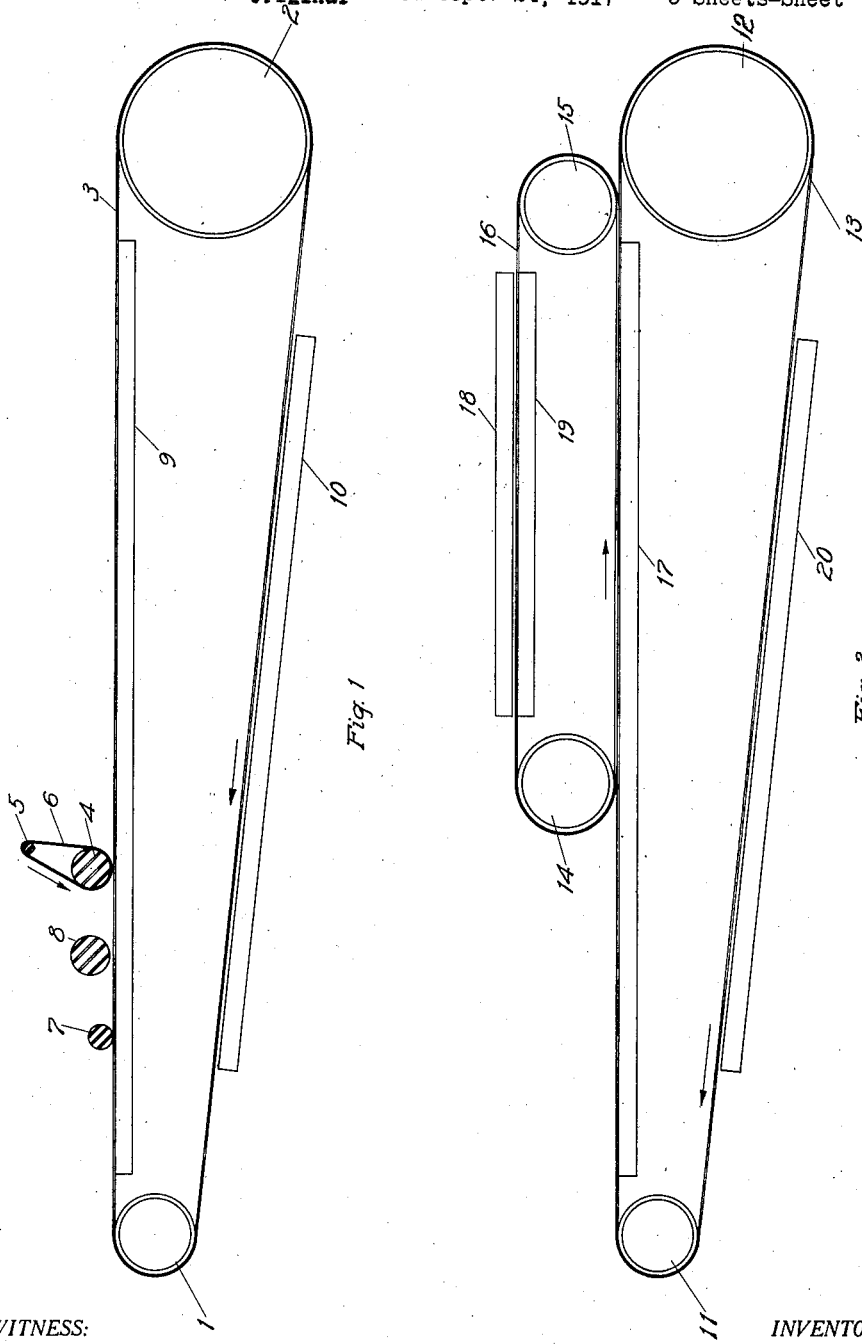
WITNESS:
INVENTOR.
Frank Engel
BY
ATTORNEY.

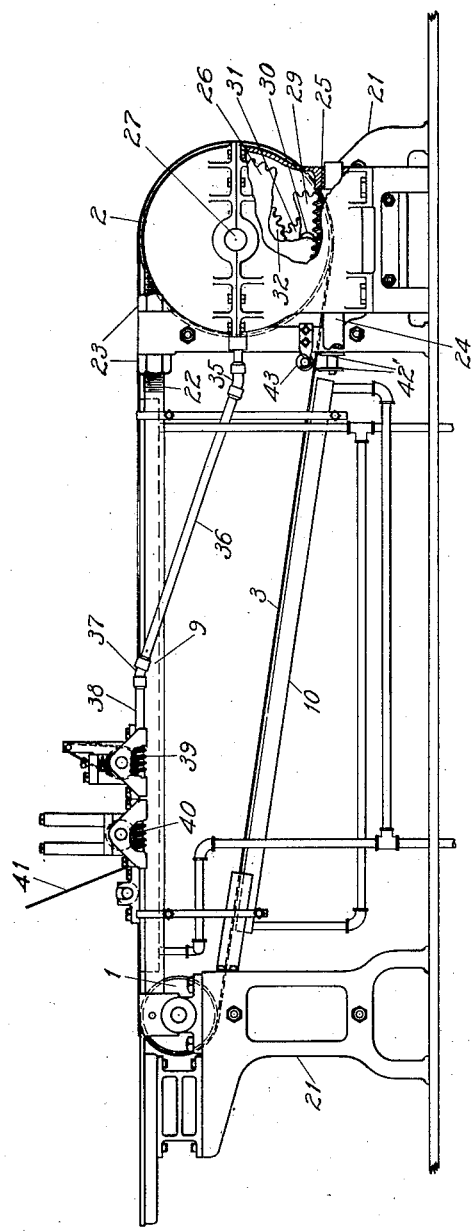

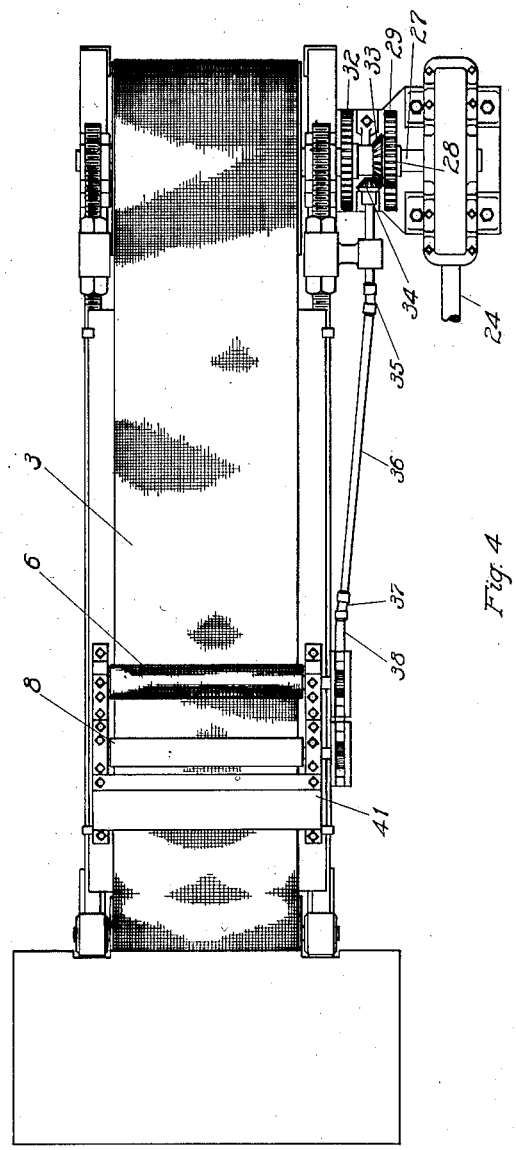

July 13, 1926.  1,592,691
F. ENGEL
MECHANISM AND METHOD FOR PASTING BATTERY PLATES
Original Filed Sept. 24, 1917  5 Sheets-Sheet 4
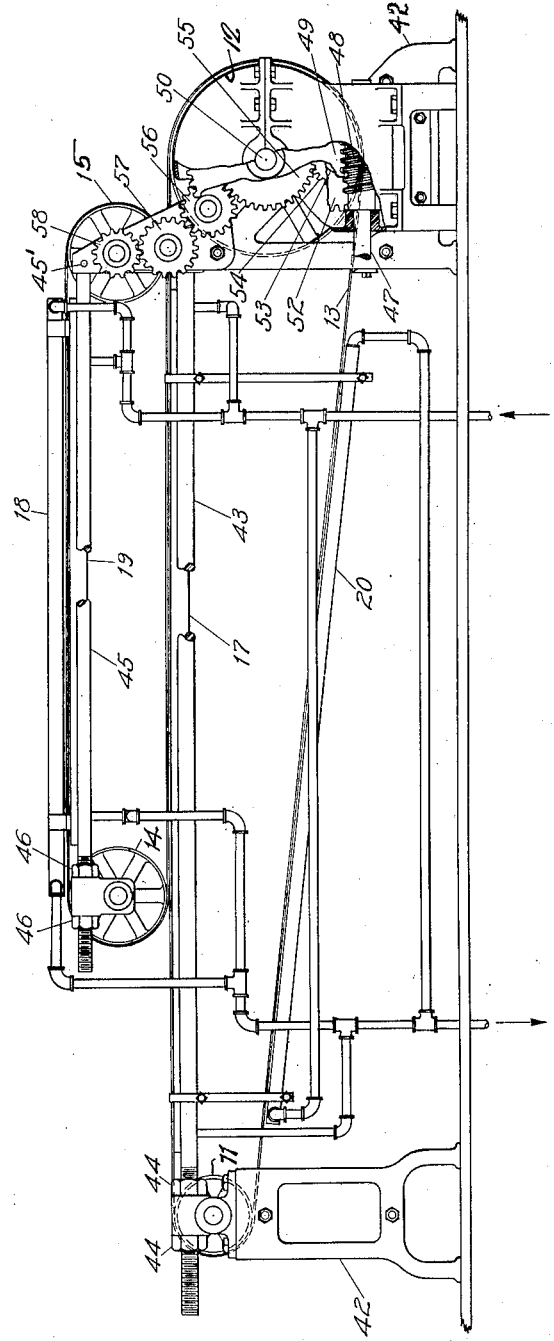
WITNESS:  INVENTOR.
Frank Engel
BY
ATTORNEY.

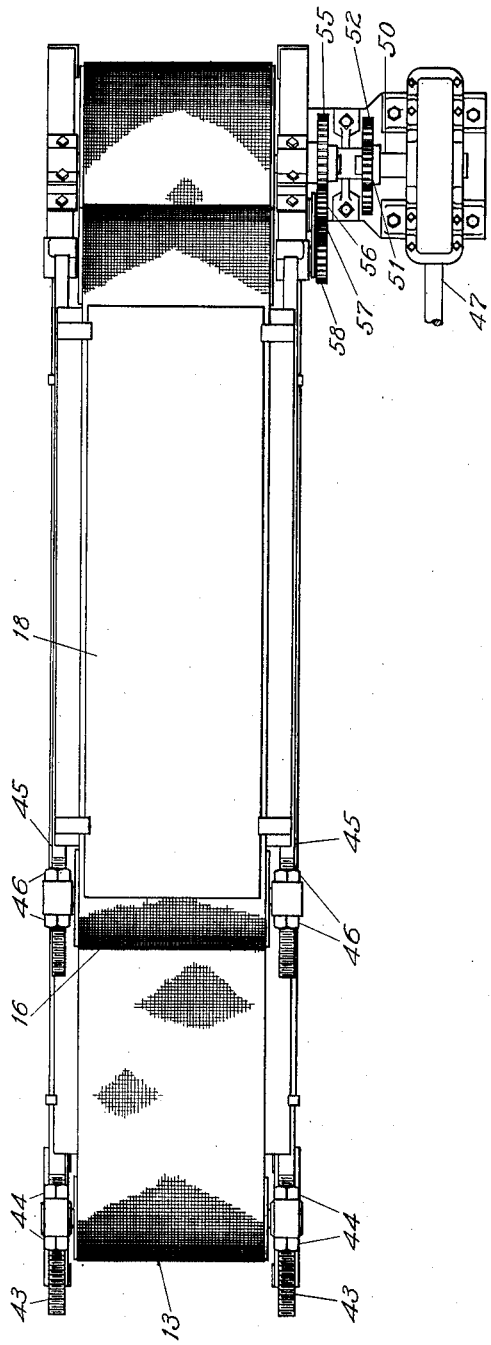

Patented July 13, 1926.

1,592,691

UNITED STATES PATENT OFFICE.

FRANK ENGEL, OF SYRACUSE, NEW YORK, ASSIGNOR TO U. S. LIGHT & HEAT CORPORATION, OF NIAGARA FALLS, NEW YORK, A CORPORATION OF NEW YORK.

MECHANISM AND METHOD FOR PASTING BATTERY PLATES.

Application filed September 24, 1917, Serial No. 192,900. Renewed October 20, 1924.

The present invention relates to mechanism and method for pasting battery plates.

In the manufacture of storage battery plates of the Fauré type, it has been the practice with many manufacturers to apply the paste to the battery grids by hand. This is a laborious process and produces plates in which there is no uniformity. Various machines have been designed and are being used for applying the paste to the grids. One of said machines is described in an application for patent No. 108,947, plate pasting machine, filed July 12, 1916, by the present applicant. The present invention relates to improvements in machines for carrying out the process of applying paste to the grids and to the method of applying said paste.

One of the objects of the present invention is to provide a plate pasting machine in which the paste will be applied to the grids uniformly and expeditiously.

A further object is to provide a mechanism for applying the paste to the grids so that the subsequent handling of the battery plates will be simplified.

A further object is to provide mechanism for pasting battery plates in which there will be a minimum waste of paste.

A further object is to provide a machine for applying paste in such a manner that a minimum of shrinkage will occur after the paste has been applied.

A further object is to provide a method for applying paste to the battery grids which will result in a uniform product and which will simplify subsequent handling.

Further objects will be apparent as the description proceeds.

Referring to the drawings—

Figure 1 represents schematically the fundamental features of one part of the mechanism according to the present invention.

Figure 2 represents schematically a fundamental feature of another part of the mechanism according to the present invention.

Figures 3 and 4 are side elevation and plan views respectively, of that part of the mechanism illustrated in Fig. 1.

Figures 5 and 6 represent elevation and plan views respectively of that part of the mechanism illustrated in Fig. 2.

A description of the mechanism according to the present invention may be prefaced by a short discussion of the fundamental features of the invention. According to the present invention, the paste is applied to the battery grids by machinery, being packed into the grids between two moving fabric belts. As at present preferred, the mechanism for accomplishing the pasting and finishing of the plates is divided into two parts which, for convenience, will be designated hereafter as the pasting unit and the finishing unit. It is to be understood, however, that said pasting unit and said finishing unit form complementary parts of the same mechanism. Dividing the mechanism into two parts has certain advantages which will be referred to hereinafter.

Figure 1 represents schematically the principles of the pasting machine. In said machine a pair of drums 1, 2, are provided, upon which is mounted an endless belt 3 which should be of fabric, as for instance, canvas which has good moisture-absorbing properties. A pair of rollers 4 and 5 are provided upon which is mounted an endless belt 6 of similar fabric. The belts 3 and 6 are caused to move by suitable mechanism to apply paste to a battery grid and pack said paste into said grid. A roller 7 is mounted upon the belt 3 for the purpose of applying a weight to the grid whereby the fabric belt will firmly grip said grid to carry it along with a movement of translation. A roller 8, positively driven by suitable mechanism, is also mounted upon the belt 3 and serves the purpose of "breaking down" the paste and applying it roughly to the grid before said grid passes between belts 6 and 3, at which time the paste is firmly packed into the grid. The absorbent properties of the belts serve at the same time to take up some of the surface moisture of the pasted grids. The numeral 9 represents an abutment on the inside of the belt 3 against which the rollers 7, 8 and 4 are adapted to exert pressure. Said abutment 9 has associated therewith a heating mechanism whereby the paste is heated as it goes through the pasting machine. The heating mechanism associated with the abutment 9 should extend beyond the point at which the belt 6 operates, for a considerable distance, for the purpose of additionally drying out the surface moisture from the plate. The result of this removal of the surface moisture is that the fabric belt does not pull the paste out of the grid when said grid is removed. The underside of the belt 3 has associated therewith a heater 10, whose function it is to dry the moisture out of the belt whereby the grids which are fed into the pasting unit will always be applied to a dry part of the belt.

After the grids have been carried to the right hand end of the pasting unit, as viewed in Fig. 1, the plates will be removed by an operator and will be applied to the left hand end of the finishing unit, the principles of which are illustrated in Fig. 2. The finishing unit has a pair of drums 11, 12, upon which is mounted an endless belt 13 preferably of fabric similar to the fabric of belts 3 and 6. Said finishing unit is also provided with a pair of drums 14 and 15 which carry an endless belt 16 of similar fabric. On the inside of the belt 13 is an abutment 17 which has associated therewith suitable heating mechanism. It will be noted from Fig. 2 that the belt 16 does not extend the full length of the belt 13. The heating mechanism associated with the abutment 17 should extend materially beyond the belt 16 whereby to thoroughly dry out the surface moisture from the grids. The upper part of the belt 16 has associated therewith a pair of heaters 18 and 19 arranged respectively on the outside and on the inside of said belt. The under part of the belt 13 has associated therewith a heater 20. The purpose of the heaters 18, 19 and 20 is to provide dry belts at the point at which the grid is fed into the finishing unit.

By dividing the mechanism into two parts, the advantage is obtained that the excess paste which clings to the grids around the lugs and along the outside edges, may be scraped off after the grids are removed from the pasting unit and before they are applied to the finishing unit. Inasmuch as the heater associated with the abutment 9 of the pasting unit will not completely dry out the paste but will merely remove the surface moisture, said excess paste which is scraped from the grids will still be in condition to be reapplied to the grids, whereby a minimum of waste will occur.

As the plate is carried to the right by the belt 3 of the pasting machine, beyond the region at which the belt 6 operates, one side of the plate will be visible, whereby an operator may apply paste to that side, if, for any reason, the grid was not completely filled. Upon taking the plate from the right hand end of the pasting machine said plate should preferably be turned over, so that its other side is visible as it is being carried along from the left hand end of the finishing machine. An operator may apply paste to said other side at any point which may require it. Such deficiencies may occur if the heaters are not operating properly. The mechanism comprising rollers 14 and 15, belt 16 and their associated parts, should preferably be pivoted adjacent to the roll 15, whereby roller 15 will bear heavily on the plate and effectively squeeze the paste into the grid.

After the grids have been removed from the pasting unit, as illustrated in Fig. 1, and have passed between the belts 13 and 16, as illustrated in Fig. 2, the paste will have been densely and uniformly packed into the grids and the surface of the grids will have been finished. Furthermore, inasmuch as the excess moisture has been removed from the paste by the absorbent action of the belts and by the heating mechanism, shrinkage of the paste will not occur to a material degree. Heretofore, in the ordinary process of hand pasting, and even with machine pasting, it has been necessary to pickle the plates to prevent the paste from shrinking and dropping out of the grids. The subsequent handling of the plates will therefore be simplified.

Figs. 3 and 4 illustrate a particular embodiment of the pasting unit which has been used in practice and found successful. The two drums 1 and 2 are mounted upon legs 21, 21. Said legs 21, 21, are held the required distance apart by rods 22. The relative position of said legs may be adjusted by means of nuts 23, 23, whereby proper tension of the belt 3 may be maintained. Power may be applied to the pasting unit as illustrated in Figs. 3 and 4, through a shaft 24, from any suitable source. Said shaft is provided with a worm 25 which is adapted to mesh with a gear 26. Said gear 26 is fixedly mounted upon the shaft 27, which shaft drives the pinion 28, illustrated in Fig. 4, but not shown in Fig. 3. The pinion 28 drives the gear 29, which is illustrated in full in Fig. 4 and broken away in Fig. 3. Said gear 29 is fast upon and drives the shaft 30, illustrated in Fig. 3 but not shown in Fig. 4. The shaft 30 drives the pinion 31, which is mounted underneath and meshes with the gear 32. The gear 32 is fast on the shaft of drum 2 and therefore drives said drum. The pinion 28 has secured thereto a beveled pinion 33, which beveled pinion drives a second beveled pinion 34, which, through universal joint 35, shaft 36, universal joint 37 and shaft 38 drives a pair of worms 39 and 40. Worm 39 is adapted to drive the roller 4 upon which the fabric belt 6 is mounted, and the worm 40 is adapted to drive the roller 8 which serves to break down and apply the paste to the grids. Rollers 4 and 5, upon which the belt 6 is mounted, and the roller 8 are mounted in trunnions which permit movement in a vertical direction normal to the abutment 9. Inequalities in the thickness of the grids will therefore be compensated for. A guard 41 is mounted on the left of the breaking down roller 8. Said guard 41 will act as a hopper for feeding paste underneath said roller 8. A pair of scrapers 42', 42', may be provided on the underside of the belt 3 whereby to scrape off excess paste. A roller 43, mounted above said scrapers, will hold the belt thereagainst.

A system of piping has been illustrated for supplying steam to the heaters 9 and 10. The particular system of piping constitutes no part of the present invention and need not be described in detail. It will be understood that said piping should supply a sufficient amount of steam to the heater 10 and the heater associated with the abutment 9, to provide the necessary heating. If preferred, an electric heating system or any other preferred heating system, could be used in place of the steam-heating system illustrated.

Figs. 5 and 6 represent an embodiment of that part of the invention which has to do with the finishing unit, the principles of which are illustrated in Fig. 2. Said finishing unit is provided with a pair of legs 42, 42, which are held in proper spaced relation by rods 43. Adjustment of the legs may be provided by nuts 44, 44, whereby the belt 13 may be held under the proper tension. The drum 15 is also mounted upon one of the legs 42. The drum 14 is held in the proper spaced relation with drum 15 by means of the rods 45, the position of the drum 14 relative to the drum 15 being adjusted by means of the nuts 46, 46. The rods 45, 45 should have pivotal connection with the right hand leg 42, as at the point 45', whereby the drum 14 may have a swinging movement. The drum 14 will bear heavily on the plates as they are carried underneath the same by the belt 13, whereby the paste will be flush with the upper and lower surfaces of the grids. The drum 15 should be mounted a sufficient distance higher than the abutment 17 to permit the passage of the thickest plate which the mechanism is designed to accommodate. Since the drums 14 and 15 with the belt 16 are free to turn as a unit about the pivot point 45', the drum 14 will rest on the grids but the drum 15 will be held slightly above the average grid. The resulting inclined position of belt 16 will cause the gradual receding of said belt 16 from the grids as they move along.

Power for operating the unit illustrated in Figs. 5 and 6 may be transmitted from any suitable source through the shaft 47. Said shaft 47 has mounted thereon a worm 48 which is adapted to drive the gear 49, illustrated in Fig. 5. Said gear 49 is mounted upon and drives the shaft 50. Said shaft 50 drives the pinion 51, which drives the gear 52, illustrated in Fig. 6. The gear 52 drives the shaft 53, which drives the pinion 54. The pinion 54 is mounted underneath and drives the gear 55, which is mounted on the shaft of the drum 12 and drives the same. The gear 55 operates through gears 56, 57 and 58 to drive the drum 15.

The system of piping which supplies the heaters in Figs. 5 and 6 need not be described herein. It will be obvious that if preferred, the heating system illustrated in Figs. 5 and 6 may be replaced by any other desired heating means.

The mechanism in the pasting unit illustrated in Figs. 1, 3 and 4 should preferably be so geared up that the belt 6 has a slower movement of translation than the belt 3, whereby the paste will be effectively packed into the grids. In the finishing unit illustrated in Figs. 2, 5 and 6, the belts 13 and 16 should be given the same speed of translation.

The described embodiment of the present invention has been chosen merely for the purpose of illustration. It is subject to many modifications. It is intended that the patent shall cover all such modifications that come within the scope of the invention as defined by the appended claims.

What I claim as new and desire to secure by Letters Patent of the United States, is—

1. A plate pasting machine comprising means for packing paste into a grid and heating means for applying heat to said packing means.

2. In a plate pasting machine, a pair of moving belts adapted to embrace a battery grid to pack paste into same, and heating means for applying heat to said belts.

3. In a plate pasting machine, fabric means for packing paste into a grid and heating means for applying heat to said fabric means.

4. In combination, a belt, an abutment located inside of said belt and having heating means associated therewith, and pressure means located outside of said belt adapted to cooperate with said abutment.

5. In combination, a belt, a second belt adjacent to the first belt, said first belt being adapted to convey battery plates, said second belt being adapted to engage said plates through a portion only of the travel of said plates, and heating means adjacent to said first belt, adapted to heat said plates through a material portion of the remainder of their travel.

6. Storage battery plate pasting and finishing mechanism comprising means for conveying a battery grid, means for applying paste to said grid, and means for heating said conveying means and for drying the surface moisture from the paste in said grid, said heating means being operative at the point of application of said paste.

7. In plate pasting and finishing mechanism, a fabric belt adapted to operate on the paste in a battery grid, and means for drying said belt.

8. The method of manufacturing battery plates which consists of applying paste to a grid and, at the same time, rapidly drying out the surface moisture from said paste.

9. The method of manufacturing battery plates which consists of applying paste to a grid and finishing the surface thereof between moving fabric members, heating said members and said paste during the process.

10. The method of manufacturing battery plates which consists of applying paste to a grid, drying out the surface moisture and then finishing the surface of said paste between moving fabric members.

11. The method of manufacturing battery plates which consists of applying paste to a grid, drying out the surface moisture, cleaning off the excess paste from around the edges of the grid and finishing the surface of said paste between moving fabric members.

12. The method of manufacturing battery plates which consists of applying paste to a grid, squeezing said paste between moving fabric members, and heating said paste during said squeezing process.

13. The method which consists in applying absorbtive material to the faces of a pasted battery plate and thereafter subjecting said plate to a drying treatment.

14. The process which consists in applying liquid-containing active material to a plate grid; applying sheets of liquid-absorbing material to the exposed faces of the active material in said grid; and thereafter subjecting the plate to a liquid-removing treatment.

15. A plate pasting machine comprising means for packing paste into a grid and simultaneously absorbing surface moisture from the freshly pasted grid, and heating means for applying heat to said packing means and for additionally drying said grids.

16. In a plate pasting machine, a pair of moving belts of absorbent material adapted to embrace a battery grid to pack paste into the same, and heating means for applying heat to said belts.

17. In a plate pasting machine, moisture absorbent fabric means for packing paste into a grid, and heating means for applying heat to said fabric.

18. In combination, a belt of absorbent material, a second belt of absorbent material adjacent to the first belt, said first belt being adapted to convey battery plates, said second belt being adapted to engage said plates through a portion only of the travel of said plates, and heating means adjacent to said first belt adapted to heat said plates through a material portion of the remainder of their travel.

19. Storage battery plate pasting and finishing mechanism comprising means for conveying a battery grid, means for applying paste to said grid, and means for heating said conveying means and for drying the surface moisture from the paste in said grid, said heating means being operative at and beyond the point of application of said paste.

20. The method of manufacturing battery plates which consists in applying paste to a grid, squeezing said paste between fabric members of absorbent material whereby surface moisture is removed from said pasted grids, and thereafter heating said grids to further dry the same.

21. A method of manufacturing battery plates which consists in applying paste to a grid, squeezing said paste between fabric members of absorbent material whereby surface moisture is removed from said pasted grid, and heating said plates during said squeezing process and afterwards to further dry said grids.

22. The method of manufacturing battery plates which consists in applying paste to a grid, squeezing said paste between members of absorbent material whereby surface moisture is removed from said pasted grids and thereafter further drying said grids.

In witness whereof, I have hereunto subscribed my name.

FRANK ENGEL.